US011966753B2

(12) United States Patent
Thom et al.

(10) Patent No.: US 11,966,753 B2
(45) Date of Patent: *Apr. 23, 2024

(54) SELECTIVE BOOT SEQUENCE CONTROLLER THAT CRYPTOGRAPHICALLY VALIDATING CODE PACKAGE FOR RESILIENT STORAGE MEMORY

(71) Applicant: Microsoft Technology Licensing, LLC, Redmond, WA (US)

(72) Inventors: Stefan Thom, Mill Creek, WA (US); Paul England, Bellevue, WA (US); Robert Karl Spiger, Seattle, WA (US); Brian Telfer, Seattle, WA (US); Sangho Lee, Bellevue, WA (US); Marcus Peinado, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,422

(22) Filed: Nov. 2, 2022

(65) Prior Publication Data
US 2023/0047247 A1 Feb. 16, 2023

Related U.S. Application Data

(63) Continuation of application No. 16/853,204, filed on Apr. 20, 2020, now Pat. No. 11,520,596.

(51) Int. Cl.
*G06F 9/4401* (2018.01)
*G06F 3/06* (2006.01)
(Continued)

(52) U.S. Cl.
CPC .......... *G06F 9/4406* (2013.01); *G06F 3/0604* (2013.01); *G06F 3/0622* (2013.01);
(Continued)

(58) Field of Classification Search
CPC .... G06F 9/4406; G06F 3/0604; G06F 3/0622; G06F 3/065; G06F 3/0659; G06F 3/0673; G06F 13/4068; G06F 21/572
See application file for complete search history.

(56) References Cited

U.S. PATENT DOCUMENTS 11,520,596 B2 * 12/2022 Thom .................. G06F 21/575

* cited by examiner

*Primary Examiner* — Tammara R Peyton (57) ABSTRACT

A storage device for booting a host computing device includes a first storage memory region having a first storage memory controller, a second storage memory region having a second storage memory controller, and a resilient boot controller. The resilient boot controller is configured to store boot code in the first storage memory region, prevent write access by the host computing device through the first storage memory controller to the first storage memory region, detect a reset of the host computing device through the input/output interface, copy at least a portion of the boot code from the first storage memory region to the second storage memory region, responsive to detection of the reset of the host computing device, and enable read access of the copied boot code by the host computing device through the second storage memory controller of the second storage memory region, responsive to the copy operation.

20 Claims, 7 Drawing Sheets

Related U.S. Application Data (60) Provisional application No. 62/981,888, filed on Feb. 26, 2020.

(51) Int. Cl.
*G06F 13/40* (2006.01)
*G06F 21/57* (2013.01)

(52) U.S. Cl.
CPC ............ *G06F 3/065* (2013.01); *G06F 3/0659* (2013.01); *G06F 3/0673* (2013.01); *G06F 13/4068* (2013.01); *G06F 21/572* (2013.01); *G06F 2221/033* (2013.01)

Prevent, in the storage device, writes by the host computing device through the first storage memory controller to the first storage memory bank
402

Detect, in the storage device, a reset of the host computing device through the input/output interface
404

Copy boot code and operating system code from the first storage memory bank to the second storage memory bank
406

Communicate reads of the copied boot code and operating system code by the host computing device through the second storage memory controller of the second storage memory bank
408

SELECTIVE BOOT SEQUENCE CONTROLLER THAT CRYPTOGRAPHICALLY VALIDATING CODE PACKAGE FOR RESILIENT STORAGE MEMORY

CROSS-REFERENCE TO RELATED APPLICATIONS

This application is a continuation application of U.S. patent application Ser. No. 16/853,204, filed on Apr. 20, 2020, which claims benefit of priority to U.S. Provisional Patent Application No. 62/981,888, entitled "Selective Multi-memory Boot Controller with Resilient Memory Bank" and filed on Feb. 26, 2020, the entire disclosures of all are hereby incorporated herein by reference.

BACKGROUND

There are a lot of legacy and unsecured Internet-of-Things (IoT) devices that use Secure Digital (SD) cards for mass storage. These devices are vulnerable to operating system (OS) level attacks. The Cyber Resilient Platforms Program (CyReP) has set out to provide resiliency to these devices, but its guidance requires flash band locking for read/write/read-write protection that SD cards do not provide.

SUMMARY

The described technology provides a storage device for booting a host computing device. The storage device includes an input/output interface configured to connect to the host computing device, a first storage memory region having a first storage memory controller, a second storage memory region having a second storage memory controller, and a resilient boot controller. The resilient boot controller communicatively couples the input/output interface to the first storage memory region through the first storage memory controller and to the second storage memory region through the second storage memory controller. The resilient boot controller is configured to store boot code in the first storage memory region, prevent write access by the host computing device through the first storage memory controller to the first storage memory region, detect a reset of the host computing device through the input/output interface, copy at least a portion of the boot code from the first storage memory region to the second storage memory region, responsive to detection of the reset of the host computing device, and enable read access of the copied boot code by the host computing device through the second storage memory controller of the second storage memory region, responsive to the copy operation.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

An example resilient storage memory device may include a Secure Digital (SD) storage memory card having onboard storage memory (e.g., flash memory) and an SD card I/O interface that connects to a host computing device. An SD storage memory card can interface with the host computing device using an interface protocol, such as the Secure Digital I/O (SDIO) protocol or the Serial Peripheral Interface (SPI) protocol. The SD storage memory card may or may not be removable from the host computing device.

Generally, boot code includes programmatic instructions that are executed after a system reset to prepare a computing system to load and execute an operating system. In most cases, boot code is operating-system-agnostic, although this characteristic is not required. Boot code can be loaded into random access memory or RAM from a non-volatile storage memory, including without limitation a hard drive, a solid-state drive, on-board memory, a memory device (e.g., a flash drive, a Secure Digital storage memory card), and other storage devices and executed by the computing system from the RAM. In various implementations, the RAM can reside in the host computing device, the resilient storage memory device, or both. In addition, one or more portions of an operating system can be loaded after a system reset (after and/or concurrent with the execution of the boot code). The boot code, and possibly early-executed portions of the operating system, can present a vulnerability in the system because they initialize and configure various security conditions and functionality in the system—if they are corrupted, the malicious code can be executed before the system security is fully enabled. As such, operation of a computing system is safer if the boot code and possibly early-executed portions of the operating system are safe from malicious write modifications, even though some write modifications to later portions of the operating system may be permissible. Alternatively, operation of the computing system is safer if the boot code and possible early-executed portions of the operating system are refreshed after any system reset from a stored code set that is known to be "safe."

An example resilient storage memory device described herein has one or more defenses to prevent malware from persistently modifying one or more portions of a boot sequence embodied in boot code, and possibly early-executed portions of the operating system, stored on the resilient storage memory device. In this manner, the resilient storage memory device can be counted on to effect a clean reboot of a computing system (e.g., an IoT device, a workstation computer, a laptop computer) after a reset, because particularly vulnerable portions of the boot sequence are executed on "safe" boot code, and possibly early-executed portions of the operating system, that has not been modified by a host access (e.g., by write attempts by the host computing device) without cryptographic protections.

In one implementation, a storage memory device with an SD card interface using a System-on-a-Chip (SoC) includes at least two storage memory regions), each storage memory region being accessible through its own storage memory controller on the storage memory device. In one implementation, the storage memory regions may include, without limitation, separate regions of the same storage memory bank, separate storage memory banks, or separate and distributed regions of multiple storage memory banks. These storage memory regions also include predominantly non-volatile storage memory, such as FLASH memory. The storage memory can implement separate secure storage controllers, one for a high integrity storage memory region storing "safe" boot code and possibly OS code (which cannot be re-written without cryptographic protection) and the other for a separate low integrity storage memory region (e.g., a host-Read/Write-accessible storage memory region), which may have little or no cryptographic protection. After system reset and during the boot sequence, the safe boot code and possibly OS code are loaded into RAM from the high integrity storage memory region and/or copied from the high integrity storage memory region to the low integrity memory region and then loaded into RAM. Once in RAM, the code can be executed by the host computing device. In an implementation in which code is copied from the high integrity memory region to the low integrity memory region, "safe" boot code and possibly OS code may be loaded in RAM from either memory region, depending on design and security requirements.

Figure 1:
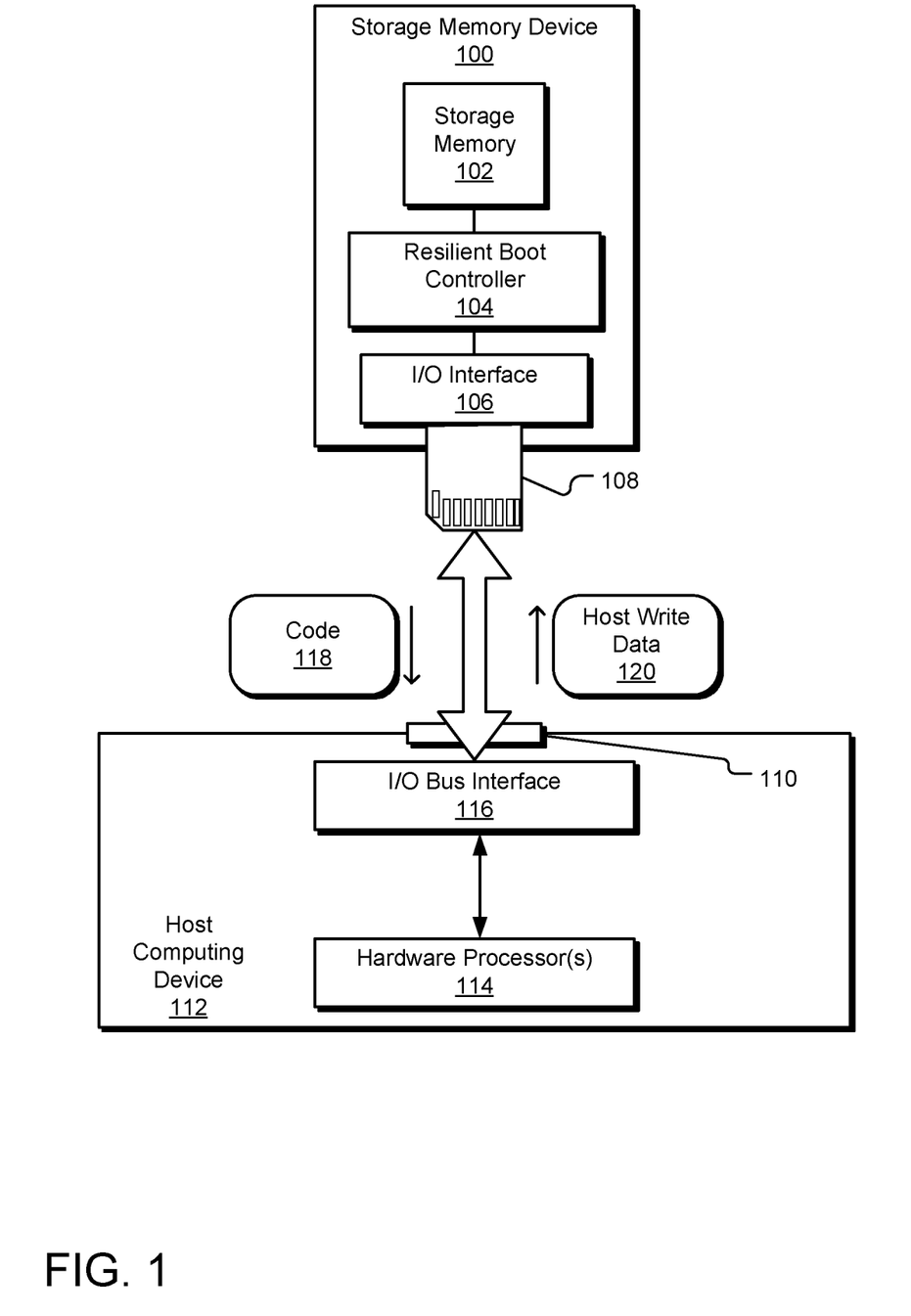
FIG. 1 illustrates a schematic of a storage memory device having a storage memory, a resilient boot controller, and an I/O interface.

FIG. 1 illustrates a schematic of a storage memory device 100 having a storage memory 102, a resilient boot controller 104, and an I/O interface 106. The storage memory device 100 stores boot code and possibly operating system code for initializing (booting) a host computing device. The storage memory device 100 is shown as also including an SD card connector 108, although other mechanical and/or electrical connections may also be employed (e.g., a mini SD card connector, a custom or proprietary connection). In one implementation, the storage memory 102 is partitioned into two storage memory regions: a high integrity storage memory region and a low integrity storage memory region. In another implementation, the storage memory 102 includes multiple physical storage memory banks, such as a high integrity storage memory bank and a low integrity storage memory bank. The different storage memory banks may communicate with the I/O interface 106 via different storage memory controllers (not shown).

As shown, the storage memory device 100 can be inserted into or be electrically connected to an SD card port 110 of a host computing device 112 (e.g., an IoT device, a workstation computer, a laptop computer). The host computing device 112 includes one or more hardware processors 114 for executing boot code, operating system code, and application code (collectively "code 118"). In one implementation, the host computing device 112 loads such code from the storage memory 102 on the storage memory device 100 into RAM (not shown) from which it can read and execute the code. The host computing device 112 can also write data to the storage memory device 100 (e.g., host write data 120). For example, the host computing device 112 can write data through the I/O interface to be written to the storage memory 102. Such data can be written to the storage memory device 100 as parameters, program code, and/or other types of data. As a result, absent the described technology, if the host computing device 112 is compromised by malicious code, the host write data 120 could target the boot code and operating system code stored on the storage memory device 100 with malicious modifications.

The impact of such malicious modifications can be mitigated or eliminated by maintaining a safe version of at least some portions of the boot code and/or operating system code in a storage memory region of the storage memory device 100 that is safe from malicious modification. In one implementation, such safe code is stored and executed in a high integrity storage memory region that cannot be modified by the host computing device 112, at least not without satisfying some cryptographic update condition. Execution of such code will boot the host computing device 112. In another implementation, such safe code is initially stored in a high integrity storage memory region and then copied to a low integrity storage memory for execution in booting the host computing device 112.

Another implementation may use a trusted platform module device (TPM—not shown) in the storage memory device 100 to gate read and write access to the code, such that only safe code is written to the high integrity storage memory region. Accordingly, only safe code is subsequently executed in the early stages of the boot sequence. In one implementation, a host computing device can write a code update package to the storage memory device, subject to one or more cryptographic update conditions). For example, the TPM can verify in the storage memory device 100 that the code update package was signed by a trusted entity to confirm that it contains only code that can be safely stored in the high integrity storage memory region. If the TPM determines that the attempted code update satisfies such a cryptographic update condition, a write of the attempted code update to high integrity storage memory is allowed. If the TPM cannot determine that the attempted code update satisfies a cryptographic update condition, a write of the attempted code update is prevented. Other cryptographic techniques may be used to ensure safe execution of a boot sequence, including measurements, attestation, encryption and security keys, etc. Other implementations may combine these techniques in some manner.

Figure 2:
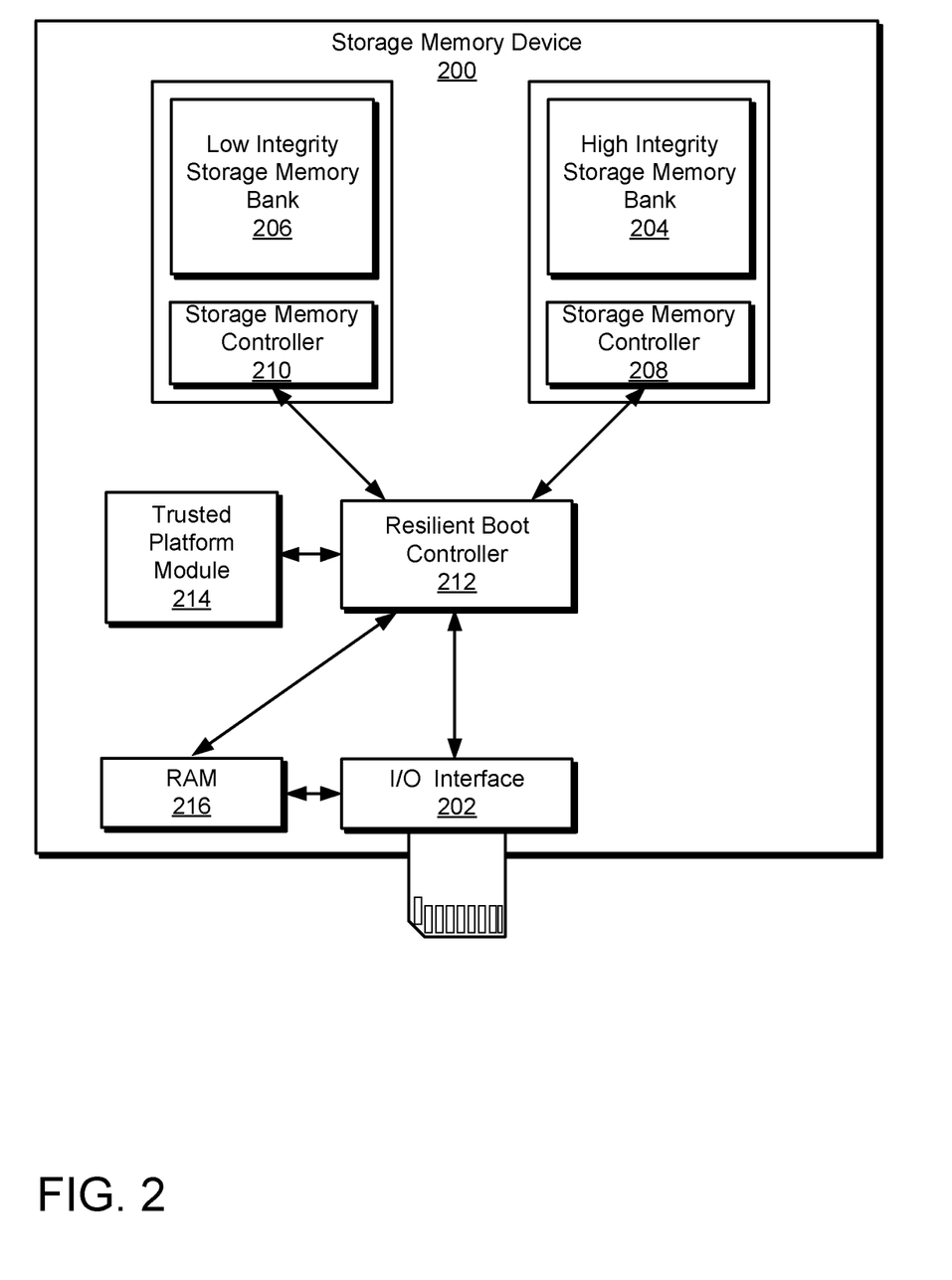
FIG. 2 illustrates an example storage memory device providing a resilient boot controller with a high integrity storage memory bank and a low integrity storage memory bank.

FIG. 2 illustrates an example storage memory device 200 providing a resilient boot controller 212 with a high integrity storage memory bank 204 and a low integrity storage memory bank 206 (each representing an example "storage memory region"). The storage memory device 200 maintains safe boot code, safe operating system (OS) code, and potentially other safe program code in the high integrity storage memory bank 204 behind a storage memory controller 208. Such code and other code can be stored in the low integrity storage memory bank 206 behind a storage memory controller 210. Read and write access to the high integrity storage memory bank 204. The low integrity storage memory bank 206 is securely managed by a resilient boot controller 212, which is capable of switching host access between the storage memory banks and further is capable of allowing or preventing write access from the host computing device to either storage memory bank.

In one implementation (a "switch" implementation), when the storage memory device 200 is connected to a host computing device and the host computing device is reset, such as booted or rebooted (e.g., collectively "booted") from the storage memory device 200, the storage memory device 200 detects the reset of the host computing device, enables read access of boot code through the storage memory controller 208 from the high integrity storage memory bank 204, thereby allowing the host computing device to safely boot from the safe boot code stored in the high integrity storage memory bank 204. In one implementation, the code is read from the high integrity storage memory bank 204 and loaded into RAM (e.g., a RAM 216 or a RAM in the host computing device), from which the host computing device executes the code. Some portion of the operating system code can also be loaded from the high integrity storage memory bank 204 to the RAM, from which the host computing device executes the code.

A storage memory switch instruction may be included in the boot code or operating system code stored in the high integrity storage memory bank 204. When read from the high integrity storage memory bank 204 and executed by the host computing device, the storage memory switch instruction instructs the resilient boot controller 212 to switch host access from the high integrity storage memory bank 204 to the low integrity storage memory bank 206. In one implementation, the storage memory switch instruction is configured for execution by the host computing device after the early, more vulnerable portion of the boot sequence is completed. In this manner, the early portion of the boot sequence is completed using safe boot code from the high integrity storage memory bank 204 that has not been modified by a host computing device write access (unless the host computing device write has satisfied a cryptographic update condition). Then, the storage memory switch instruction causes the resilient boot controller 212 to switch host access to the low integrity storage memory bank 206, from which additional code can be executed. The code in the low integrity storage memory bank 206 may have persisted since before the reset or may have been copied from the high integrity storage memory bank 204 after the reset, depending on when in the boot sequence it is to be executed.

Alternative storage memory switch instructions may be triggered or executed by the host computing device or the storage memory device 200 itself responsive to detection of satisfaction of a storage memory switch condition, including without limitation expiration of a timer, a pre-defined boot progress state (e.g., when a particular stage of the boot process starts or completes), monitoring and detection of data/signal traffic between the host computing device and the storage memory device 200, or receipt or generation of other signals When the early portion of the boot sequence has completed, then the rest of the boot sequence, as well as subsequent operations, can be read from the low integrity storage memory bank 206 into RAM (from which the host computing device executes the code), responsive to execution of the storage memory switch instruction or satisfaction of a storage memory switch condition, until the next reset of the host computing device, at which point the resilient boot controller 212 switches host read access back to the high integrity storage memory bank 204 for the next boot sequence.

In another implementation (a "copy" implementation), when the storage memory device 200 is connected to a host computing device, and the host computing device is reset, such as booted or rebooted (e.g., collectively "booted") from the storage memory device 200, the storage memory device 200 detects the reset of the host computing device, copies boot code (and possibly operating system code) from the high integrity storage memory bank 204 to the low integrity storage memory bank 206, and enables read access of boot code through the storage memory controller 210 from the low integrity storage memory bank 206. In this implementation, the early portion of the boot code, therefore, can be loaded from the low integrity storage memory bank 206 into RAM after reset, thereby allowing the host computing device to safely boot from the unmodified boot code freshly copied from the high integrity storage memory bank 204 to the low integrity storage memory bank 206.

In one implementation, after reset, the copy operation is executed by copying the "safe" code from the high integrity storage memory bank 204 through the storage memory controller 208 to the RAM 216. Thereafter, the resilient boot controller 212 switches to communicate with the low integrity storage memory bank 206 through the storage memory controller 210 and copies the code from the RAM 216 to the low integrity storage memory bank 206. The code can then be read by the host computing device and executed in the boot sequence. Other copying implementations may also be employed. Because this copied code was read-only (e.g., the resilient boot controller did not allow host computing device write access to the code in the high integrity storage memory bank) or cryptographically protected (e.g., the resilient boot controller did not allow host computing device write access to the code in the high integrity storage memory bank without authorization from the on-board TPM), the copied code is still considered safe during the early stages of the boot sequence, during which time the copied code can set up other appropriate security measures to protect against malicious writes. As such, with each reset, the boot sequence is given a fresh/safe start.

In one implementation, write access by the host computing device to the low integrity storage memory bank 206 is prevented or otherwise unavailable during an early portion of the boot sequence. Some portion of the operating system code can also be stored and copied from the high integrity storage memory bank 204 and then read from the low integrity storage memory bank 206. The code in the high integrity storage memory bank 204 is protected from write access by the host computing device (unless a cryptographic update condition has been satisfied, in some implementations).

When the early portion of the boot sequence has completed, then the rest of the boot sequence, as well as subsequent operation, can read, write, and execute from the low integrity storage memory bank 206 until the next reset of the host computing device, at which point the resilient boot controller 212 switches host access back to the high integrity storage memory bank 204 for the next boot sequence.

The "safe" boot code (and possibly OS code) is executed from RAM in a system boot sequence by the host computing device. The early portions of the system boot sequence are performed based on that "safe" boot code (and OS code) stored in or copied from the high integrity storage memory bank after the system reset. The host computing device cannot modify (e.g., it lacks write access to) the "safe" boot code (and OS code) executed during this early portion of the system boot sequence, whether in a switch implementation or a copy implementation. In one implementation, only after the early portion of the system boot sequence is completed does the host computing device gain write access to the OS code and possibly the boot code in the low integrity storage memory bank. In this manner, the "safe" boot code and OS code can safely initialize (boot) the host device after a reset without concern that the boot code and OS code have been corrupted (e.g., by a malicious alteration to the code). After execution of the "safe" boot code and OS code, the host device can execute or continue to execute code (e.g., OS code, application code) read from a low integrity storage memory bank 206 behind the storage memory controller 210 and also modify the code in the low integrity storage memory bank 206.

The storage memory device 200 may also implement the Trusted Computing Group TPM library specification, DICE, Cerberus, or some other security implementation with a memory-mapped interface, for example, to allow "safe" updates to the "safe" boot code. These various options, such as a trusted platform module (TPM), are referred to as "security protection modules" and consist of a combination of software and hardware circuitry. In the illustrated implementation, the storage memory device 200 includes a trusted platform module 214 that gates the I/O access (e.g., write access) to the storage memory controllers 208 and 210 through the resilient boot controller 212 using cryptographic conditions. For example, the storage memory device 200 may require a validated cryptographic key exchange between the host computing device and the trusted platform module 214 before allowing read and/or write access to one or both of the storage memory banks. In another example, the trusted platform module 214 measures the code in one or both of the storage memory banks to ensure that the code has not been modified without authorization and prevents the resilient boot controller 212 from allowing any reads from and/or writes to the storage memory banks. Other safety measures may be implemented.

In some implementations, at least a portion of the functionality of the resilient boot controller 212 is included in the trusted platform module 214. For example, the decision about whether to allow a switch between the high integrity storage memory bank 204 and the low integrity storage memory bank 206, in one direction or in both directions, can be allocated to the trusted platform module 214, which performs cryptographic checks (e.g., measuring code, confirming valid signatures, decrypting data/code), evaluates data (e.g., update packages, data traffic, storage memory switch conditions) or executes code (e.g., storage memory switch instructions), and triggers the resilient boot controller 212 to switch between the storage memory banks and/or prevent or allow read/write host access to the storage memory banks. As such, the resilient boot controller 212 may include or be connected to the trusted platform module 214.

In one implementation, the resilient boot controller 212 and the host computing device communicate using the RAM 216 through the I/O interface 202. The host computing machine can store a proposed program code update and authorization information (e.g., a digital signature from a code publisher or other authority) in the RAM 216. For example, the resilient boot controller 212 can read the proposed program code update from the RAM 216, hash the proposed program code update, verify its signature or other update authorization policy criteria, and send some authorization data or metadata to the trusted platform module 214 to verify that the update is signed by a publisher trusted to update the high integrity storage memory bank 204. The trusted platform module 214 can be used for a variety of cryptographic operations, including the cryptographic evaluation of program code, read requests, write requests, and other communication attempts. In this manner, the trusted platform module 214 can act as the authorization authority for accessing the high integrity storage memory bank 204 (and even the low integrity storage memory bank 206).

This gating by the trusted platform module 214 provides enhanced, yet secure, write access to the high integrity storage memory bank 204 by the host computing device. For example, a host computing device can receive program code updates from various sources, such as a cloud updating service or a secure storage memory device. The program code updates can be encrypted and signed by a trusted source and passed through the host computing device in a secure manner. If the program code update satisfies one or more predetermined cryptographic conditions enforced by the trusted platform module 214, then the trusted platform module 214 can indicate to the resilient boot controller 212 to allow the write access of the program code update through the storage memory controller 208 to the high integrity storage memory bank 204. If the program code update does not satisfy the one or more predetermined cryptographic conditions, then the trusted platform module 214 indicates to the resilient boot controller 212 to prevent the write access through the storage memory controller 208.

Figure 3:
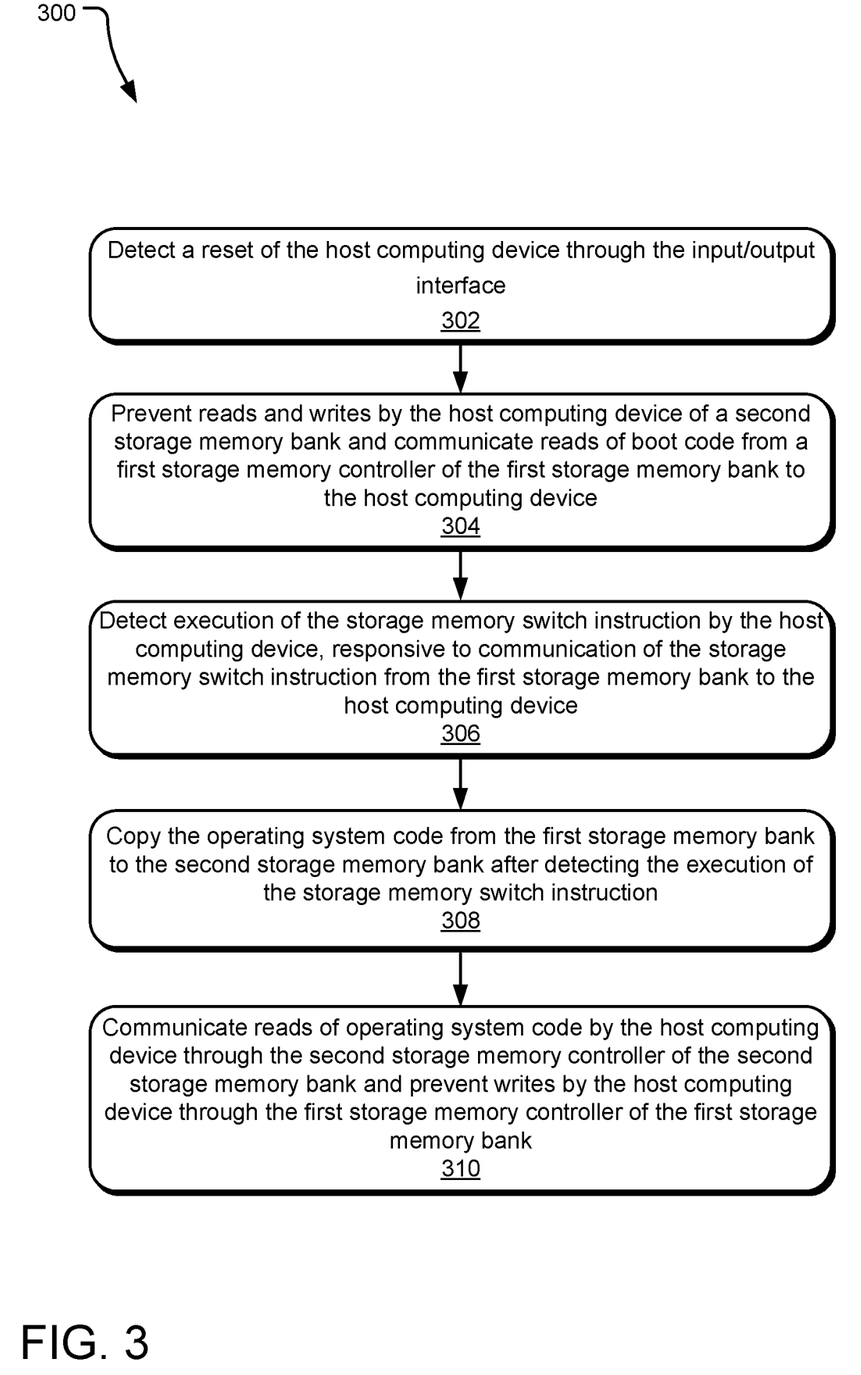
FIG. 3 illustrates example operations of booting a host computing device.

FIG. 3 illustrates example operations 300 of booting a host computing device from a storage device having a first storage memory controller, a first storage memory bank (an example high integrity storage memory region), a second storage memory controller, and a second storage memory bank (an example low integrity storage memory region). A detection operation 302 detects, in the storage device, a reset of the host computing device through the input/output interface. An I/O control operation 304 prevents reads and writes by the host computing device through the second storage memory controller of the second storage memory bank and communicates reads of boot code from the first storage memory controller of the first storage memory bank to the host computing device, during a first time period after detecting the reset.

Another detection operation 306 detects execution of a storage memory switch instruction by the host computing device, responsive to communication of the storage memory switch instructions from the first storage memory bank to the host computing device during the first time period of a boot sequence. Alternatively, the detection operation 306 detects satisfaction of a storage memory switch condition. A copying operation 308 copies operating system code from the first storage memory bank to the second storage memory bank responsive to detection of the execution of a storage memory switch instruction or satisfaction of a storage memory switch condition. A second time period of the boot sequence starts after copying the operating system code. An I/O control operation 310 communicates reads of operating system code by the host computing device through the second storage memory controller of the second storage memory bank and preventing writes by the host computing device through the first storage memory controller of the first storage memory bank, during the second time period after the first time period.

Figure 4:
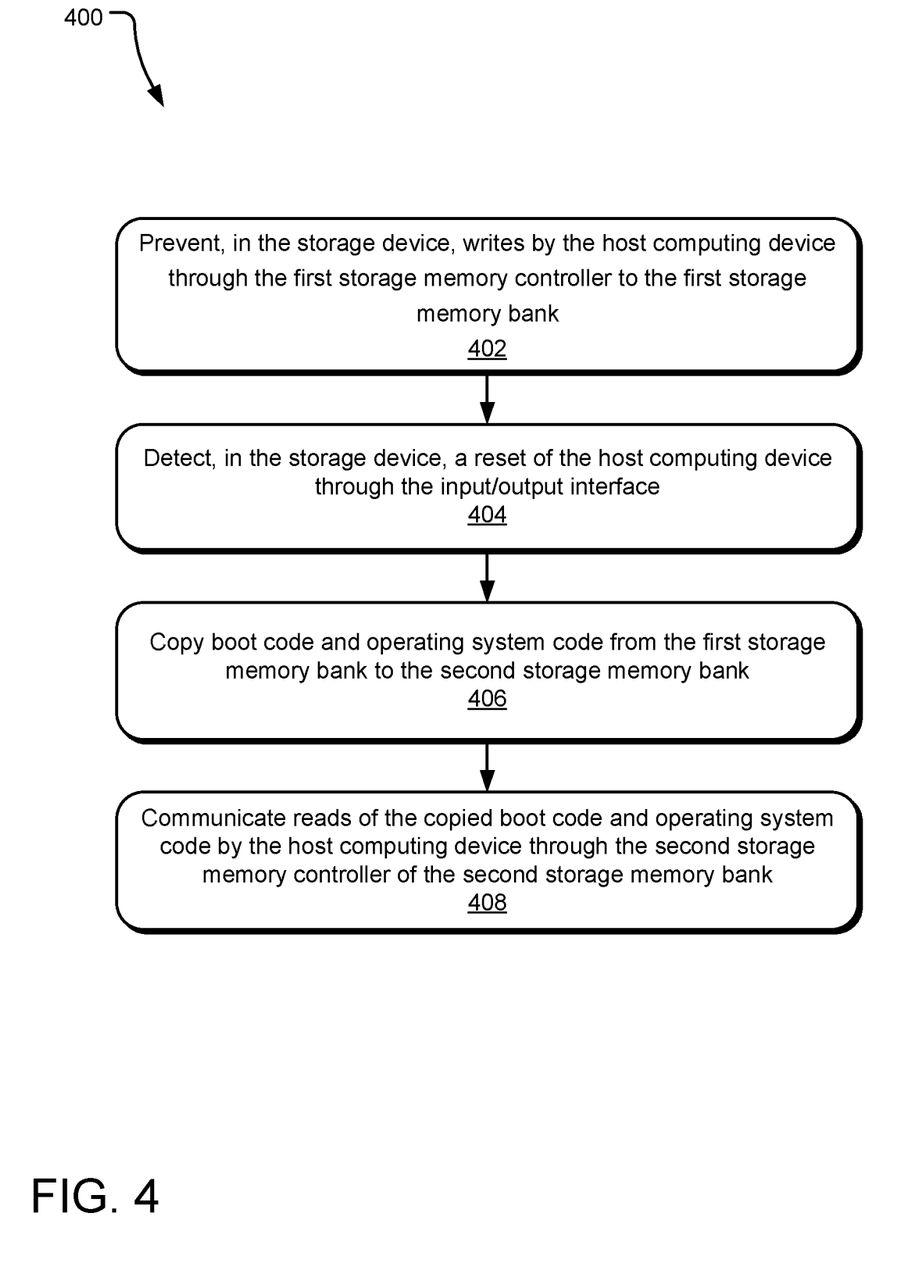
FIG. 4 illustrates other example operations of booting a host computing device.

FIG. 4 illustrates other example operations 400 of booting a host computing device from a storage device having a first storage memory controller, a first storage memory bank (an example high integrity storage memory region), a second storage memory controller, and a second storage memory bank (an example low integrity storage memory region). An I/O control operation 402 prevents writes by the host computing device through the first storage memory controller to the first storage memory bank. A detection operation 404 detects, in the storage device, a reset of the host computing device through the input/output interface. A copy operation 406 copies boot code and operating system code from the first storage memory bank to the second storage memory bank, responsive to detection of the reset of the host computing device. An I/O control operation 408 communicate reads of the copied boot code and operating system code by the host computing device through the second storage memory controller of the second storage memory bank.

In an alternative implementation, more vulnerable portions of the boot code are initially stored in the high-integrity storage memory bank, and less vulnerable portions of the boot code are stored in the low-integrity storage memory bank. In the boot sequence, the less vulnerable portions of the boot code are executed after the more vulnerable portions of the boot code. Responsive to detection of a reset by the host computing device, the resilient boot controller switches the host computing device access to the first storage memory controller of the first storage memory region, such that read access is enabled and write access is prevented to the more vulnerable portions of the boot code by the host computing device through the first storage memory controller of the first storage memory region and read and write access is prevented to the less vulnerable portions of the boot code by the host computing device through the second storage memory controller of the second storage memory region. Thereafter, responsive to execution of the more vulnerable portions of the boot code in the boot sequence by the host computing device, read and write access is enabled to the less vulnerable portions of the boot code by the host computing device through the second storage memory controller of the second storage memory region and read and write access to the more vulnerable portions of the boot code by the host computing device through the first storage memory controller of the first storage memory region.

Figure 5:
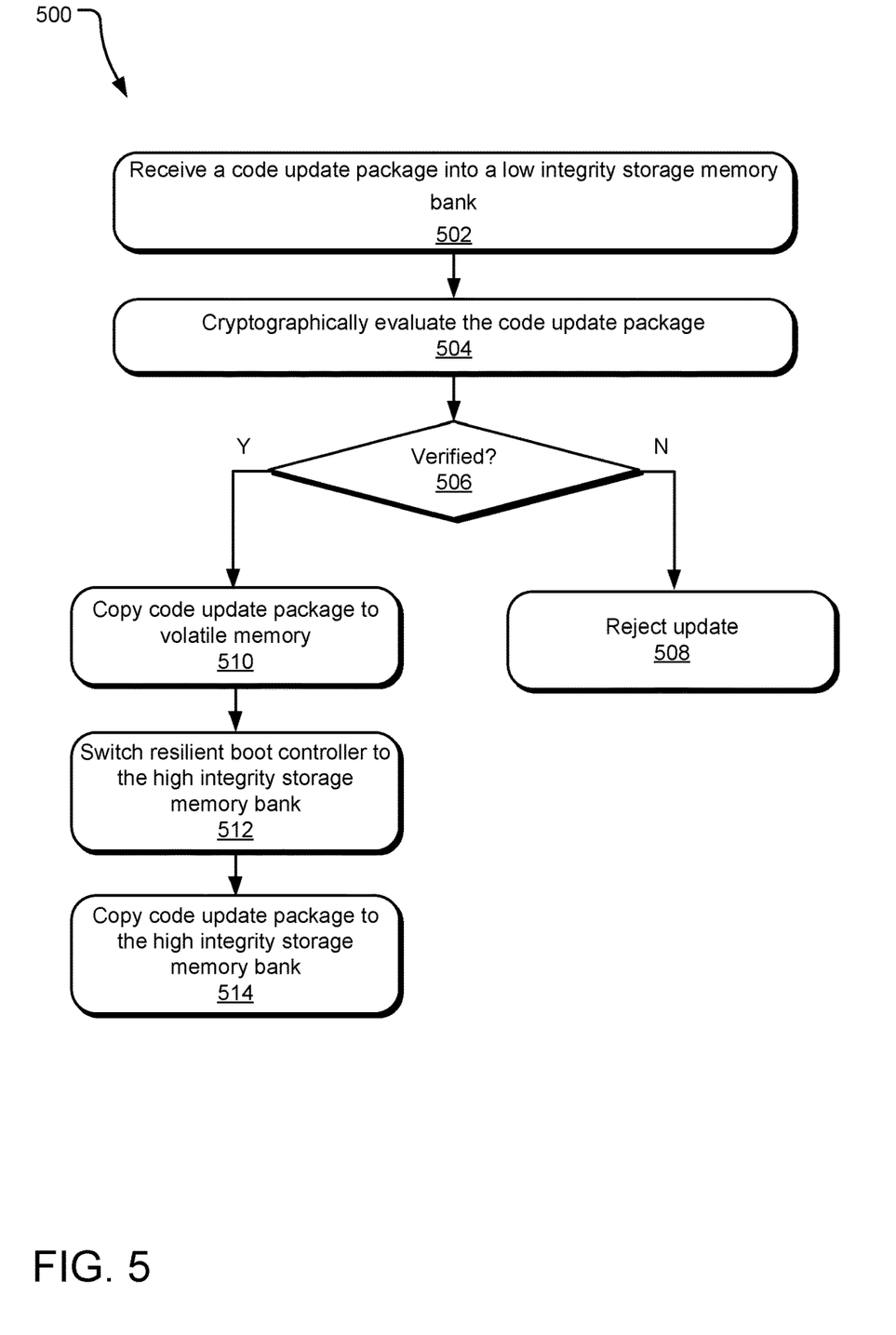
FIG. 5 illustrates example operations for updating "safe" code in a storage device without a required reset.

FIG. 5 illustrates example operations 500 for updating "safe" code in a storage device without a required reset. The storage device includes trusted platform module, a resilient boot controller, an I/O interface, a volatile memory (e.g., RAM), a first storage memory controller, a first storage memory bank (e.g., FLASH memory) and a second storage memory controller and a second storage memory bank (e.g., FLASH memory). A receiving operation 502 receives a code update package into a low integrity storage memory bank from a host computing device. A code update package includes code (e.g., boot code, operation system code) intended to be installed in the high integrity storage memory bank. The code update package may also include cryptographic parameters (e.g., keys, encrypted data, cryptographic identities, certificates) and other characteristics to allow a TPM to perform a cryptographic evaluation of the code update package.

An evaluation operation 504 cryptographically evaluates the code update package to determine whether the code update package satisfies a cryptographic update condition. Example cryptographic update conditions may include without limitation a determination that the code update package was cryptographically signed by a trusted entity, that the code update package can be decrypted by the trusted platform module, etc.

If the code update package is determined not to satisfy the cryptographic update condition in a decision operation 506, then the code update package is verified, and the update is rejected in a rejection operation 508 (e.g., the code update package not written to the high integrity storage memory bank).

If the code update package is determined to satisfy the cryptographic update condition in a decision operation 506, then the code update package is verified, and a copying operation 510 copies the code update package to volatile memory (e.g., on-board RAM). A switching operation 512 switches the resilient boot controller from the low integrity storage memory bank to the high integrity storage memory bank. Another copying operation 514 copies the code update package from the volatile memory to the high integrity storage memory bank. The operations depicted in FIG. 5 can all be performed before a reset of the host computing device.

Figure 6:
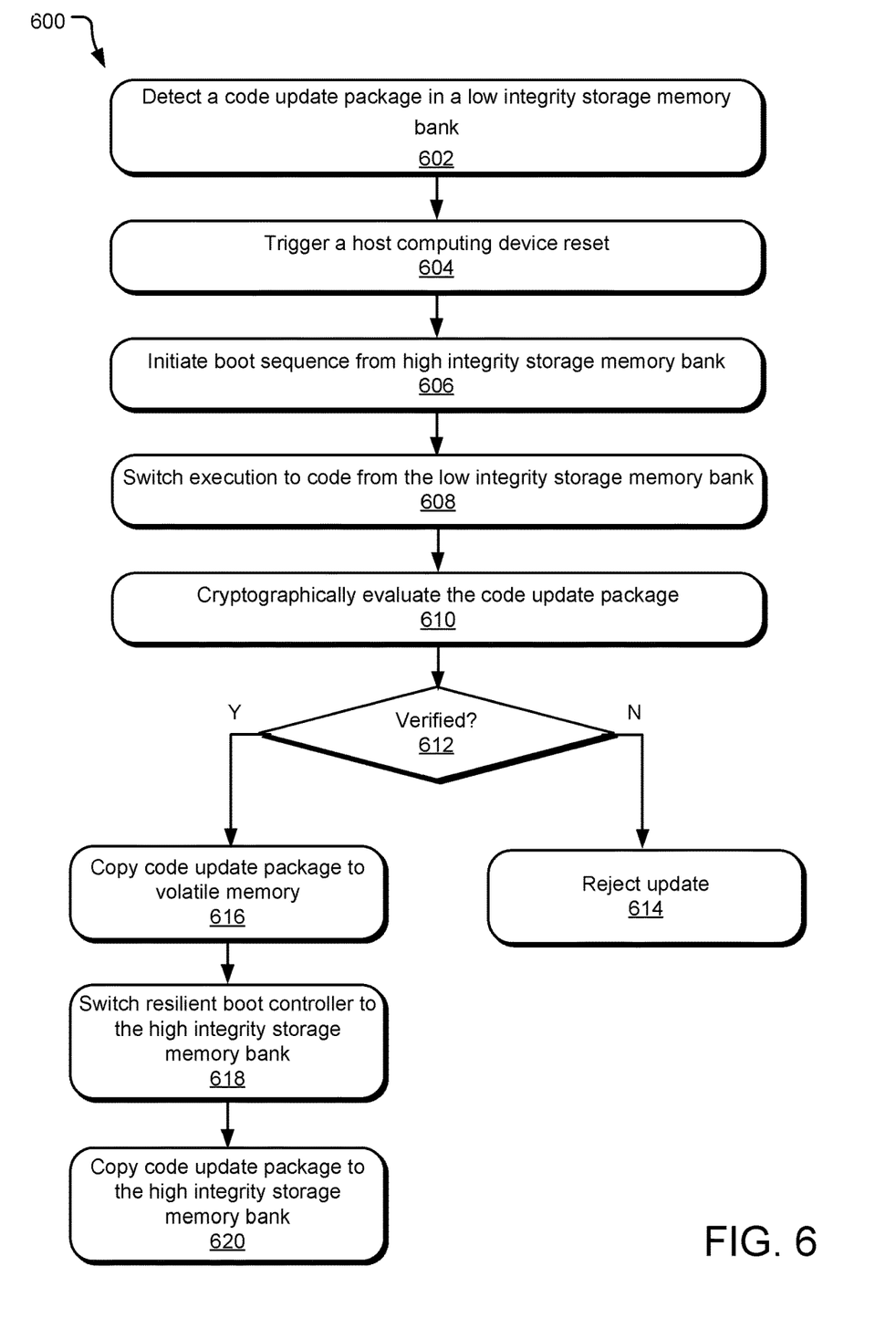
FIG. 6 illustrates example operations for updating "safe" code in a storage device with a required reset.

FIG. 6 illustrates example operations 600 for updating "safe" code in a storage device with a required reset. The storage device includes trusted platform module, a resilient boot controller, an I/O interface, a volatile memory (e.g., RAM), a first storage memory controller, a first storage memory bank (e.g., FLASH memory) and a second storage memory controller and a second storage memory bank (e.g., FLASH memory).

A detecting operation 602 receives and detects a code update package in the low integrity storage memory bank. A triggering operation 604 triggers a reset of the host computing device (e.g., detection of the code update package causes operating system code read by the host computing device to cause a reset). A boot operation 606 initiates a boot sequence based on code stored in and read from the high integrity storage memory bank.

After the reset, an early sequence of the boot code stored in the high integrity storage memory bank is executed by the host computing device, during which a switching operation 608 switches a resilient boot controller to access the low integrity storage memory bank. If the low integrity storage memory bank includes a code update package, as is assumed in this example, the code update package is copied into on-board RAM, where the trusted platform module cryptographically evaluates the code update package in an evaluation operation 610. If no code update package is detected in the low integrity storage memory bank (e.g., in a different example), then the resilient boot controller can switch back to continue allowing execution of code in the low integrity storage memory bank If the code update package is determined not to satisfy the cryptographic update condition in a decision operation 612, then the code update package is verified, and the update is rejected in a rejection operation 614 (e.g., the code update package not written to the high integrity storage memory bank).

If the code update package is determined to satisfy the cryptographic update condition in a decision operation 312, then the code update package is verified, and a copying operation 616 copies the code update package to volatile memory (e.g., on-board RAM). A switching operation 618 switches the resilient boot controller from the low integrity storage memory bank to the high integrity storage memory bank. Another copying operation 620 copies the code update package from the volatile memory to the high integrity storage memory bank. Operations 606 and higher, as depicted in FIG. 6, are all performed after a reset of the host computing device that occurs after the detection of the code update package in the low integrity storage memory bank.

Figure 7:
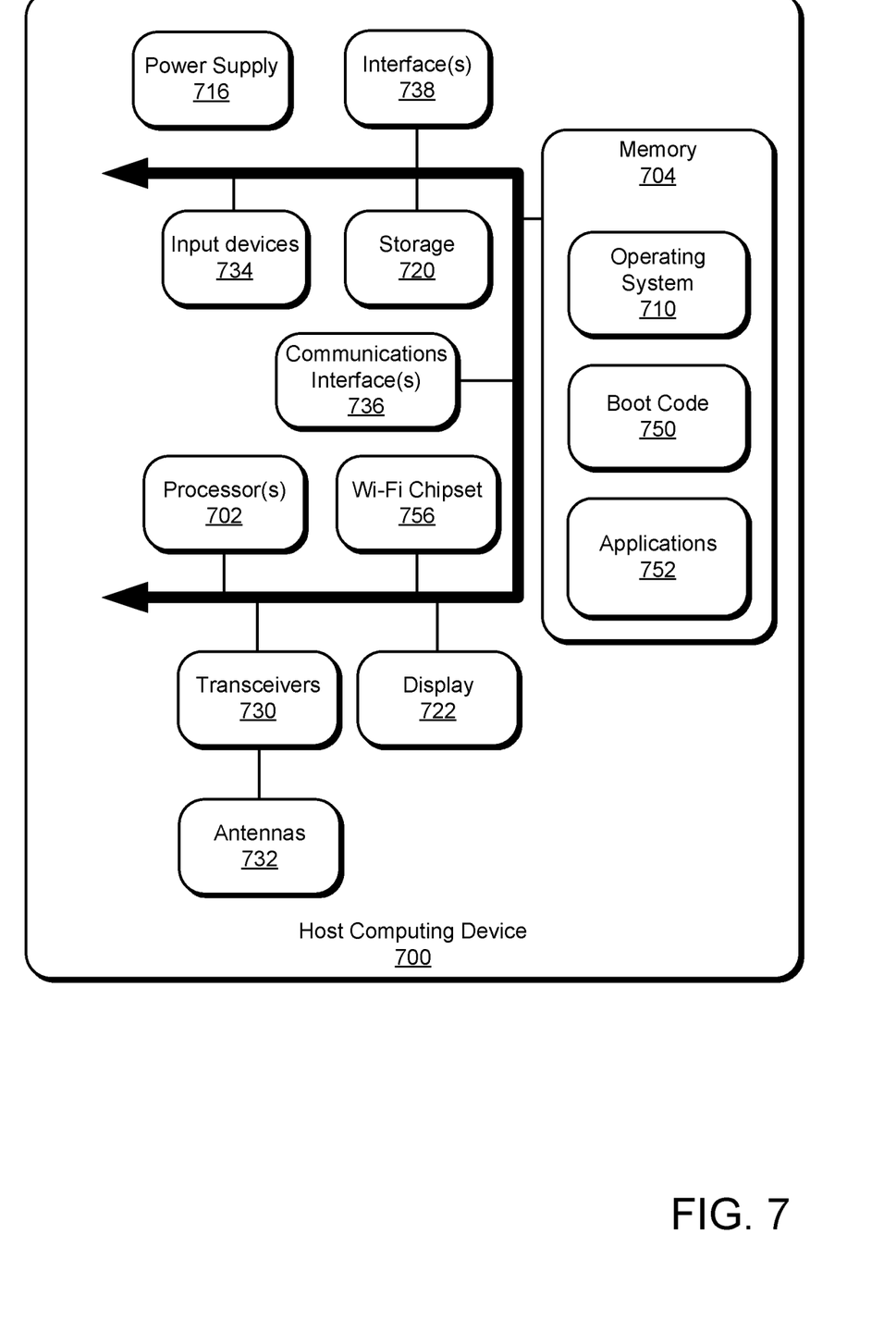
FIG. 7 illustrates an example operating environment and system for a host computing device.

FIG. 7 illustrates an example operating environment and system for a host computing device. It should be understood that the described technology may also be used in outdoor locations. The host computing device 700 may be a client device, such as a laptop, mobile device, desktop, tablet; a server/cloud device; an internet-of-things device; an electronic accessory; or another electronic device. The host computing device 700 includes one or more processor(s) 702 and a memory 704. In FIG. 7, the memory 704 generally includes both volatile memory (e.g., RAM) and non-volatile memory (e.g., flash memory). In contrast, in FIGS. 1-6, the various memories are specifically designated as "storage memory," which constitutes a non-volatile memory, and RAM, which constitutes a volatile memory. An operating system 710 resides in the memory 704 and is executed by the processor(s) 702.

In an example, a host computing device 700, as shown in FIG. 7, one or more modules or segments, such as boot code 750, application(s) 752, and other modules, are loaded into the operating system 710 on the memory 704 and/or storage 720 and executed by processor(s) 702. The storage 720 may store communication parameters and other data and be local to the host computing device 700 or may be remote and communicatively connected to the host computing device 700.

The host computing device 700 includes a power supply 716, which is powered by one or more batteries or other power sources and which provides power to other components of the host computing device 700. The power supply 716 may also be connected to an external power source that overrides or recharges the built-in batteries or other power sources.

The host computing device 700 may include one or more communication transceivers 730 which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The host computing device 700 includes a Wi-Fi chipset and may further include another communication interface 736. The host computing device 700 may use the adapter and any other types of host computing devices for establishing connections over a wide-area network (WAN) or local-area network (LAN). It should be appreciated that the network connections shown are exemplary and that other host computing devices and means for establishing a communications link between the host computing device 700 and other devices may be used.

The host computing device 700 may include one or more input devices 734 such that a user may enter commands and information (e.g., a keyboard or mouse). These and other input devices may be coupled to the host computing device 700 by one or more interfaces 738, such as a serial port interface, parallel port, or universal serial bus (USB). The host computing device 700 may further include a display 722, such as a touch screen display.

The host computing device 700 may include a variety of tangible processor-readable storage media and intangible processor-readable communication signals. Tangible processor-readable storage can be embodied by any available media that can be accessed by the host computing device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the host computing device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

An example storage device for booting a host computing device is provided. The examples storage device includes an input/output interface configured to connect to the host computing device, a first storage memory controller, a first storage memory region coupled to and accessible via the first storage memory controller, a second storage memory controller, a second storage memory region coupled to and accessible via the second storage memory controller, and a resilient boot controller. The resilient boot controller communicatively couples the input/output interface to the first storage memory region through the first storage memory controller and to the second storage memory region through the second storage memory controller. The resilient boot controller is configured to store boot code in the first storage memory region, prevent write access by the host computing device through the first storage memory controller to the first storage memory region, detect a reset of the host computing device through the input/output interface, copy at least a portion of the boot code from the first storage memory region to the second storage memory region, responsive to detection of the reset of the host computing device, and enable read access of the copied boot code by the host computing device through the second storage memory controller of the second storage memory region, responsive to the copy operation.

Another example storage device of any preceding storage device is provided, wherein the resilient boot controller is further configured to enable read access of the boot code by the host computing device through the first storage memory controller of the first storage memory region during a first time period of the boot sequence, responsive to detection the reset of the host computing device through the input/output interface, and switch read access by the host computing device from the first storage memory bank to the second storage memory bank.

Another example storage device of any preceding storage device is provided, wherein the boot code stored in the first storage memory region includes a storage memory switch instruction and the resilient boot controller is further configured to enable read access of the boot code by the host computing device through the first storage memory controller of the first storage memory region, responsive to detection the reset of the host computing device through the input/output interface, detect execution of the storage memory switch instruction by the host computing device, and switch read access by the host computing device from the first storage memory region to the second storage memory region, responsive to execution of the storage memory switch instruction by the host computing and the copy operation.

Another example storage device of any preceding storage device is provided, wherein the resilient boot controller is further configured to enable read access of the boot code by the host computing device through the first storage memory controller of the first storage memory region, responsive to detection the reset of the host computing device through the input/output interface, detect satisfaction of a storage memory switch condition, and switch read access by the host computing device from the first storage memory region to the second storage memory region, responsive to satisfaction of a storage memory switch condition and the copy operation.

Another example storage device of any preceding storage device further includes a security protection module device communicatively coupled to the resilient boot controller, the security protection module device being configured to cryptographically evaluate a code update package received from the host computing device, the resilient boot controller being further configured to update the boot code stored in the first storage memory controller with the code update package, responsive to a cryptographic evaluation that the code update package satisfies a cryptographic update condition, and prevent updating of the boot code stored in the first storage memory controller, responsive to a cryptographic evaluation that the code update package fails to satisfy a cryptographic update condition.

Another example storage device of any preceding storage device is provided, wherein the resilient boot controller is further configured to update the boot code by switching access by the host computing device from the second storage memory region to the first storage memory region and enabling write access of the code update package to the first storage memory region, prior to a subsequent reset of the host computing system.

Another example storage device of any preceding storage device is provided, wherein the security protection module device is further configured to perform the cryptographic evaluation to determine whether the code update package satisfies a cryptographic update condition, prior to a subsequent reset of the host computing system.

Another example storage device of any preceding storage device is provided, wherein the resilient boot controller is further configured to update the boot code by switching access by the host computing device from the second storage memory region to the first storage memory region and enabling write access of the code update package to the first storage memory region, after a subsequent reset of the host computing system.

Another example storage device of any preceding storage device is provided, wherein the security protection module device is further configured to perform the cryptographic evaluation to determine whether the code update package satisfies a cryptographic update condition, after the subsequent reset of the host computing system.

Another example storage device of any preceding storage device is provided, wherein the code update package is stored in the second storage memory region, prior to the subsequent reset of the host computing system.

An example method of booting a host computing device from a storage device is provided. The storage device includes an input/output interface configured to connect to the host computing device, a first storage memory region having a first storage memory controller, and a second storage memory region having a second storage memory controller. The example method includes storing boot code in the first storage memory region, preventing write access by the host computing device through the first storage memory controller to the first storage memory region, detecting a reset of the host computing device through the input/output interface, copying at least a portion of the boot code from the first storage memory region to the second storage memory region, responsive to detection of the reset of the host computing device, and enabling read access of the copied boot code by the host computing device through the second storage memory controller of the second storage memory region, responsive to the copy operation.

Another example method of any preceding method further includes enabling read access of the boot code by the host computing device through the first storage memory controller of the first storage memory region during a first time period of the boot sequence, responsive to detection the reset of the host computing device through the input/output interface, and switching read access by the host computing device from the first storage memory region to the second storage memory region.

Another example method of any preceding method is provided, wherein the boot code stored in the first storage memory region includes a storage memory switch instruction and further includes enabling read access of the boot code by the host computing device through the first storage memory controller of the first storage memory region, responsive to detection of the reset of the host computing device through the input/output interface, detecting execution of the storage memory switch instruction by the host computing device, and switching read access by the host computing device from the first storage memory region to the second storage memory region, responsive to execution of the storage memory switch instruction by the host computing and the copy operation.

Another example method of any preceding method further includes enabling read access of the boot code by the host computing device through the first storage memory controller of the first storage memory region, responsive to detection the reset of the host computing device through the input/output interface, detect satisfaction of a storage memory switch condition, and switch read access by the host computing device from the first storage memory region to the second storage memory region, responsive to satisfaction of a storage memory switch condition and the copy operation.

Another example method of any preceding method further includes cryptographically evaluating a code update package received from the host computing device, updating the boot code stored in the first storage memory controller with the code update package, responsive to a cryptographic evaluation that the code update package satisfies a cryptographic update condition, and preventing update of the boot code stored in the first storage memory controller, responsive to the cryptographic evaluation that the code update package fails to satisfy a cryptographic update condition.

Another example method of any preceding method further includes updating the boot code by switching access by the host computing device from the second storage memory region to the first storage memory region, prior to a subsequent reset of the host computing system, and enabling write access of the code update package to the first storage memory region, prior to a subsequent reset of the host computing system.

Another example method of any preceding method further includes performing the cryptographic evaluation to determine whether the code update satisfies a cryptographic update condition, prior to a subsequent reset of the host computing system.

Another example method of any preceding method further includes updating the boot code by switching access by the host computing device from the second storage memory region to the first storage memory region, after a subsequent reset of the host computing system, and enabling write access of the code update package to the first storage memory region, after a subsequent reset of the host computing system.

Another example method of any preceding method further includes performing the cryptographic evaluation to determine whether the code update satisfies a cryptographic update condition, after the subsequent reset of the host computing system.

An example storage device for booting a host computing device using boot code in a boot sequence includes an input/output interface configured to connect to the host computing device, a first storage memory controller, a first storage memory region coupled to and accessible via the first storage memory controller, a second storage memory controller, a second storage memory region coupled to and accessible via the second storage memory controller, a resilient boot controller. The resilient boot controller communicatively couples the input/output interface to the first storage memory region through the first storage memory controller and to the second storage memory region through the second storage memory controller. The resilient boot controller is configured to store a first portion of the boot code in the first storage memory region, store a second portion of the boot code in the second storage memory region, wherein execution of the second portion of the boot code follows the first portion of the boot code in the boot sequence, detect a reset of the host computing device through the input/output interface, enable read access and prevent write access to the first portion of the boot code by the host computing device through the first storage memory controller of the first storage memory region and prevent read and write access to the second portion of the boot code by the host computing device through the second storage memory controller of the second storage memory region, responsive to the reset operation, and enable read and write access to the second portion of the boot code by the host computing device through the second storage memory controller of the second storage memory region and prevent read and write access to the first portion of the boot code by the host computing device through the first storage memory controller of the first storage memory region, responsive to execution of the first portion of the boot code in the boot sequence by the host computing device.

An example system of booting a host computing device from a storage device is provided. The storage device includes an input/output interface configured to connect to the host computing device, a first storage memory region having a first storage memory controller, and a second storage memory region having a second storage memory controller. The example system includes means for storing boot code in the first storage memory region, means for preventing write access by the host computing device through the first storage memory controller to the first storage memory region, means for detecting a reset of the host computing device through the input/output interface, means for copying at least a portion of the boot code from the first storage memory region to the second storage memory region, responsive to detection of the reset of the host computing device, and means for enabling read access of the copied boot code by the host computing device through the second storage memory controller of the second storage memory region, responsive to the copying.

Another example system of any preceding system further includes means for enabling read access of the boot code by the host computing device through the first storage memory controller of the first storage memory region during a first time period of the boot sequence, responsive to detection the reset of the host computing device through the input/output interface, and means for switching read access by the host computing device from the first storage memory region to the second storage memory region.

Another example system of any preceding system is provided, wherein the boot code stored in the first storage memory region includes a storage memory switch instruction and further includes means for enabling read access of the boot code by the host computing device through the first storage memory controller of the first storage memory region, responsive to detection the reset of the host computing device through the input/output interface, means for detecting execution of the storage memory switch instruction by the host computing device, and means for switching read access by the host computing device from the first storage memory region to the second storage memory region, responsive to execution of the storage memory switch instruction by the host computing and the copy operation.

Another example system of any preceding system further includes means for enabling read access of the boot code by the host computing device through the first storage memory controller of the first storage memory region, responsive to detection the reset of the host computing device through the input/output interface, means for detecting satisfaction of a storage memory switch condition, and means for switching read access by the host computing device from the first storage memory region to the second storage memory region, responsive to satisfaction of a storage memory switch condition and the copy operation.

Another example system of any preceding system further includes means for cryptographically evaluating a code update package received from the host computing device, means for updating the boot code stored in the first storage memory controller with the code update package, responsive to a cryptographic evaluation that the code update package satisfies a cryptographic update condition, and means for preventing update of the boot code stored in the first storage memory controller, responsive to the cryptographic evaluation that the code update package fails to satisfy a cryptographic update condition.

Another example system of any preceding system further includes means for updating the boot code by switching access by the host computing device from the second storage memory region to the first storage memory region, prior to a subsequent reset of the host computing system, and means for enabling write access of the code update package to the first storage memory region, prior to a subsequent reset of the host computing system.

Another example system of any preceding system further includes means for performing the cryptographic evaluation to determine whether the code update satisfies a cryptographic update condition, prior to a subsequent reset of the host computing system.

Another example system of any preceding system further includes means for updating the boot code by switching access by the host computing device from the second storage memory region to the first storage memory region, after a subsequent reset of the host computing system, and means for enabling write access of the code update package to the first storage memory region, after a subsequent reset of the host computing system.

Another example system of any preceding system further includes means for performing the cryptographic evaluation to determine whether the code update satisfies a cryptographic update condition, after the subsequent reset of the host computing system.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A storage device for booting a host computing device, the storage device comprising:
    an input/output interface configured to connect to the host computing device;
    a first storage memory controller;
    a first storage memory region coupled to and accessible via the first storage memory controller;
    a second storage memory controller;
    a second storage memory region coupled to and accessible via the second storage memory controller; and
    a controller configured to:
        detect a code update package in the first storage memory region, wherein the first storage memory region has a lower associated security than the second storage memory region;
        initiate a boot sequence from the second storage memory region;
        cryptographically evaluate the code update package; and
        based on cryptographically validating the code package, copy at least a portion of the code update package from the first storage memory region to the second storage memory region.

2. The storage device of claim 1, wherein initiating the boot sequence further comprises triggering a reset of the host computing device.

3. The storage device of claim 1, wherein the controller is configured to reject the code update package when validation of the code update package fails to satisfy a cryptographic update condition.

4. The storage device of claim 1, wherein copying the portion of the code update package to the second storage memory region comprises:
    copying the portion of the code update package from the first storage memory region to volatile memory; and
    copying the portion of the code update package from the volatile memory to the second storage memory location.

5. The storage device of claim 1, wherein the boot sequence comprises determining whether a code update package is detected in the first storage memory region.

6. The storage device of claim 5, wherein the controller is further configured to revert execution to the first storage memory region during the boot sequence when a code update package is not detected in the first storage memory region.

7. A method for processing a code update package for boot code of a host computing device, the method comprising:
    detecting a code update package in a first memory region having a first memory controller, wherein the first memory region has a lower associated security than a second memory region having a second memory controller;
    resetting the host computing device to initiate execution from the second storage memory region;
    based on cryptographically validating the code update package during execution from the second storage memory region, copying the code update package to the second storage memory region, thereby updating the boot code of the host computing device using the code update package.

8. The method of claim 7, further comprising:
    enabling read access of the boot code via the first storage memory controller of the first storage memory; and
    switching read access by the host computing device from the first storage memory region to the second storage memory region.

9. The method of claim 1, further comprising:
    preventing update of the boot code responsive to determining the code update package fails to satisfy a cryptographic update condition.

10. The method of claim 7, wherein resetting the host computing device initiates a boot sequence that determines whether a code update package is detected in the first storage memory region.

11. The method of claim 10, wherein the boot sequence reverts execution to the first storage memory region when a code update package is not detected in the first storage memory region.

12. The method of claim 7, wherein the boot sequence cryptographically validates the code update package and rejects the code update package if validation is not successful.

13. The method of claim 7, wherein copying the code update package to the second storage memory region comprises:
    copying the code update package from the first storage memory region to volatile memory; and
    copying the portion of the code update package from the volatile memory to the second storage memory location.

14. A system, comprising:
at least one processor; and
memory storing instructions that, when executed by the at least one processor, cause the system to perform a set of operations, the set of operations comprising:
after a reset of the system and during a boot sequence, determining whether a code update package is available in a first storage memory region having an associated first storage memory controller, wherein the first storage memory region has a lower associated security than the second storage memory region;
based on determining the code update package is available in the first storage memory region, cryptographically validating the code update package; and
based on cryptographically validating the code update package, updating boot code of the system using the code update package.

15. The system of claim 14, wherein the system is reset in response to identifying the code update package in the first storage memory region.

16. The system of claim 14, wherein the boot sequence comprises execution from the second storage region.

17. The system of claim 16, wherein the set of operations further comprises:
based on determining the code update package is not available in the first storage region, resetting the system to initiate a boot sequence from the first storage region.

18. The system of claim 14, wherein the set of operations further comprises:
based on determining the code update package failed cryptographic validation, rejecting the code update package.

19. The system of claim 14, wherein the at least one processor comprises a resilient boot controller that manages the first memory controller and the second memory controller according to the set of operations.

20. The system of claim 14, wherein updating the boot code of the system using the code update package comprises:
copying the code update package from the first storage memory region to volatile memory; and
copying the portion of the code update package from the volatile memory to the second storage memory location.

* * * * *